US 11,104,575 B2

(12) United States Patent
Chen et al.

(10) Patent No.: US 11,104,575 B2
(45) Date of Patent: Aug. 31, 2021

(54) NANOCATALYSTS, PREPARATION METHODS AND APPLICATIONS FOR REFORMING CARBON DIOXIDE AND METHANE TO SYNGAS

(71) Applicant: FUJIAN INSTITUTE OF RESEARCH ON THE STRUCTURE OF MATTER, CHINESE ACADEMY OF SCIENCES, Fujian (CN)

(72) Inventors: Yumin Chen, Fujian (CN); Guocong Guo, Fujian (CN); Zhongning Xu, Fujian (CN); Zhiqiao Wang, Fujian (CN); Qingsong Chen, Fujian (CN); Hongzi Tan, Fujian (CN)

(73) Assignee: FUJIAN INSTITUTE OF RESEARCH ON THE STRUCTURE OF MATTER, CHINESE ACADEMY OF SCIENCE, Fujian (CN)

( * ) Notice: Subject to any disclaimer, the term of this patent is extended or adjusted under 35 U.S.C. 154(b) by 181 days.

(21) Appl. No.: 16/300,120

(22) PCT Filed: Mar. 15, 2017

(86) PCT No.: PCT/CN2017/076793
§ 371 (c)(1),
(2) Date: Nov. 9, 2018

(87) PCT Pub. No.: WO2017/193696
PCT Pub. Date: Nov. 16, 2017

(65) Prior Publication Data
US 2019/0144275 A1 May 16, 2019

(30) Foreign Application Priority Data

May 12, 2016 (CN) .......................... 201610316509.6
May 12, 2016 (CN) .......................... 201610316808.X (Continued)

(51) Int. Cl.
*B01J 23/75* (2006.01)
*B01J 23/78* (2006.01)
(Continued)

(52) U.S. Cl.
CPC ................ *C01B 3/40* (2013.01); *B01J 21/04* (2013.01); *B01J 23/745* (2013.01); *B01J 23/75* (2013.01);
(Continued)

(58) Field of Classification Search
CPC .. B01J 23/894; B01J 23/8946; B01J 23/8906; B01J 23/8913; B01J 23/892;
(Continued)

(56) References Cited

U.S. PATENT DOCUMENTS 5,476,963 A 12/1995 Wirtz et al.
2002/0022755 A1* 2/2002 Dongara .............. B01J 23/8966
585/661

(Continued)

FOREIGN PATENT DOCUMENTS

CN 101279271 A 10/2008
CN 101376105 A * 3/2009 .............. B01J 23/83
(Continued)

OTHER PUBLICATIONS

Machine translation of CN105562113A, publication May 11, 2016.*
(Continued)

*Primary Examiner* — Jun Li
(74) *Attorney, Agent, or Firm* — Nath, Goldberg & Meyer; Tanya E. Harkins

(57) ABSTRACT

The catalyst in this present application includes a support and an active component dispersed on/in the support; wherein the support is at least one selected from inorganic oxides and the support contains macropores and mesopores; and the active component includes an active element, and (Continued)

the active element contains an iron group element. As a high temperature stable catalyst for methane reforming with carbon dioxide, the catalyst can be used to produce syngas, realizing the emission reduction and recycling utilization of carbon dioxide. Under atmospheric pressure and at 800° C., the supported metal catalyst with hierarchical pores shows excellent catalytic performance. In addition to high activity and good selectivity, the catalyst has high stability, high resistance to sintering and carbon deposition.

16 Claims, 8 Drawing Sheets

(30) Foreign Application Priority Data

Jan. 24, 2017 (CN) .......................... 201710059735.5
Mar. 7, 2017 (CN) .......................... 201710130834.8

(51) Int. Cl.
| | | |
|---|---|---|
| B01J 23/83 | (2006.01) | |
| B01J 23/89 | (2006.01) | |
| B01J 35/10 | (2006.01) | |
| B01J 37/02 | (2006.01) | |
| B01J 37/08 | (2006.01) | |
| B01J 37/18 | (2006.01) | |
| B01J 37/34 | (2006.01) | |
| C01B 3/40 | (2006.01) | |
| B01J 23/745 | (2006.01) | |
| B01J 23/755 | (2006.01) | |
| B01J 21/04 | (2006.01) | |
| B01J 35/00 | (2006.01) | |

(52) U.S. Cl.
CPC ............. B01J 23/755 (2013.01); B01J 23/78 (2013.01); B01J 23/83 (2013.01); B01J 23/89 (2013.01); B01J 23/892 (2013.01); B01J 23/894 (2013.01); B01J 23/8906 (2013.01); B01J 23/8913 (2013.01); B01J 23/8946 (2013.01); B01J 35/0013 (2013.01); B01J 35/0066 (2013.01); B01J 35/10 (2013.01); B01J 35/109 (2013.01); B01J 35/1019 (2013.01); B01J 35/1057 (2013.01); B01J 35/1061 (2013.01); B01J 35/1076 (2013.01); B01J 37/0201 (2013.01); B01J 37/0236 (2013.01); B01J 37/08 (2013.01); B01J 37/18 (2013.01); B01J 37/343 (2013.01); C01B 2203/0238 (2013.01); C01B 2203/107 (2013.01); C01B 2203/1052 (2013.01); C01B 2203/1058 (2013.01); C01B 2203/1064 (2013.01); C01B 2203/1094 (2013.01); Y02P 20/52 (2015.11)

(58) Field of Classification Search
CPC .. B01J 35/1061; B01J 35/1066; B01J 35/109; B01J 2523/13; B01J 2523/3775; B01J 2523/828; B01J 2523/845
See application file for complete search history.

(56) References Cited

U.S. PATENT DOCUMENTS

| | | | |
|---|---|---|---|
| 2005/0119116 | A1 | 6/2005 | Espinoza et al. |
| 2014/0206527 | A1* | 7/2014 | Okumura ................ C07C 51/25 |
| | | | 502/210 |
| 2015/0013225 | A1 | 1/2015 | Al-Muhaish et al. |
| 2017/0128912 | A1* | 5/2017 | Boualleg ................ B01J 23/892 |

FOREIGN PATENT DOCUMENTS

| | | | |
|---|---|---|---|
| CN | 101450310 | A | 6/2009 |
| CN | 101733104 | A | 6/2010 |
| CN | 102151570 | A | 8/2011 |
| CN | 102380394 | A | 3/2012 |
| CN | 103058138 | A | 4/2013 |
| CN | 103706374 | A | 4/2014 |
| CN | 104039445 | A | 9/2014 |
| CN | 104549285 | A | 4/2015 |
| CN | 104707614 | A | 6/2015 |
| CN | 105562113 | A | 5/2016 |
| CN | 105944733 | A | 9/2016 |
| CN | 106000405 | A | 10/2016 |
| WO | 0200338 | A1 | 1/2002 |
| WO | 2008147013 | A2 | 12/2008 |
| WO | 2008147013 | A3 | 12/2008 |
| WO | 2013068905 | A1 | 5/2013 |
| WO | 2014092474 | A1 | 6/2014 |
| WO | 2015189189 | A1 | 12/2015 |

OTHER PUBLICATIONS

Machine translation of 101376105A, publication Mar. 4, 2009.*
Lu, et al., "Coking- and Sintering-Resistant Palladium Catalysts Achieved Through Atomic Layer Deposition", Science, vol. 335, pp. 1205-1208, Mar. 2012.
Guo, et al., "Direct, Nonoxidative Conversion of Methane to Ethylene, Aromatics, and Hydrogen", Science, vol. 344, pp. 616-619, May 2014.
European Search Report Oct. 31, 2019 corresponding to application No. 17795314.8.
Communication pursuant to Rules 70(2) and 70a(2) EPC dated Dec. 3, 2019 corresponding to European application No. 17795314.8-1101.
Yang, Huaming "Inorganic Functional Material-Impregnation Method" dated May 31, 2007; Reference pp. 83-86; English Translation Attached.
First Search Report; Application No. 201610316808X; dated Nov. 22, 2017.
First Office Action dated Jan. 11, 2018; and Search Report Corresponding to Chinese Application No. 201610316509.6; English Translation Attached.
First Office Action dated Jan. 2, 2019; and Search Report Corresponding to Chinese Application No. 201710130834.8; English Translation Attached.
Li Ning, et al.; "Catalytic Performance of Ni/Zr02/Al203 for Co2 Reforming of Methane"; Technoology & Development of Chemical Industry;vol. 23 No. 3; Mar. 2008; English Abstract Attached.
Wang Mingzhi, et al. "Advance in Ni-based catalysts for the carbondioxide reforming of methane" Chemical Industry and Engineering Process; vol. 34 No. 8; pp. 3027-3033 and p. 3039; 2015; English Abstract Attached.
"Study of Methane Reforming with Carbon Dioxide ov Ni/ A—Al203, Ni/MgO and Ni/SiO2 Catalysts" Journal of Molecular Catalysis (China); Feb. 1997.

* cited by examiner

NANOCATALYSTS, PREPARATION METHODS AND APPLICATIONS FOR REFORMING CARBON DIOXIDE AND METHANE TO SYNGAS

This is a National Phase Application filed under 35 U.S.C. 371 as a national stage of PCT/CN2017/076793, filed Mar. 15, 2017, an application claiming the benefit of Chinese Application No. 201710130834.8, filed Mar. 7, 2017, Chinese Application No. 201710059735.5, filed Jan. 24, 2017, Chinese Application No. 201610316808.X, filed May 12, 2016 and Chinese Application No. 201610316509.6, filed May 12, 2017, the content of each of which is hereby incorporated by reference in its entirety.

TECHNICAL FIELD

The present application refers to a catalyst, preparation method and application for reforming carbon dioxide and methane to syngas, belonging to the field of chemical engineering.

BACKGROUND

Coal, petroleum and natural gas are three major fossil energy sources. In China, coal resources are abundant, while in recent years the pollution of the atmosphere, soil and groundwater has become more and more serious in the process of coal mining and utilization, limiting its massive use. However, the Chinese petroleum reserves are low and must be imported, leading to high usage cost. In recent years, with Chinese shale gas resource leaping to the world front row, the development and utilization of natural gas has taken more and more attention. The Chinese government has introduced policies to encourage the comprehensive and high-efficiency utilization of natural gas. The high-efficiency utilization of natural gas has risen to the national strategic altitude. In addition to direct usage of natural gas as a fuel, methane, which is a main component in natural gas, can be converted to chemical products with high added value by efficient conversion of syngas. For instance, methane can be used to produce ammonia and methanol for large tonnage needs, and methane also can be used to produce the intermediates of liquid fuels, such as olefins, aromatics and the like.

At present, syngas is industrially produced mainly using natural gas as raw material, mainly including partial oxidation and steam conversion of natural gas. Partial oxidation of natural gas is a relatively energy-consuming method, which consumes a lot of oxygen or air as feed gas. If a catalyst is not used, the reaction temperature must be reached up to a temperature ranging from 1300 to 1400° C. Even if a catalyst is used, the temperature of catalytic bed is about in a range from 900 to 1000° C. and the reaction need be carried out in high pressure (3.0 MPa), which is demanding for the resistance of equipment to high temperature and high pressure. In intermittent process of steam conversion of natural gas, the highest temperature is as high as 1300° C. It is an energy-intensive process. In continuous process of steam conversion of natural gas, although energy consumption is lower, there still are strict requirements for the resistance of equipment to high temperature and high pressure. And whether it is in intermittent process or in continuous process, the equipment corrosion by steam in raw material gas at high temperature will affect the service life of equipment, increasing the process cost. In these technological processes, there are technical problems including high reaction temperature, high energy consumption, and strict requirements for the resistance of equipment to high temperature, high pressure and the like. Therefore, it is of great significance for industrial production of syngas to develop a production process without water and oxygen.

In addition to methane steam reforming and methane partial oxidation, methane reforming with carbon dioxide is a syngas production technology which has attracted more and more attention. The advantages of methane reforming with carbon dioxide are as follows: (1) Methane dry reforming with carbon dioxide dispenses with oxygen and water, with lower requirements for equipment. (2) The ratio of $H_2/CO$ is adjustable, which is more suitable as the raw material of Fischer-Tropsch synthesis; and the reaction can be carried out at a temperature above 650° C., and the energy consumption is relatively low. (3) The source of carbon dioxide is extensive, which is cheaper than oxygen. The process simultaneously achieves the efficient use of methane and the carbon dioxide emission reduction, with significant economic benefits and environmental benefits. Carbon dioxide is the end product of efficient utilization of coal and its downstream products. It is an important content of clean coal utilization how to realize the recycling of carbon dioxide and make waste profitable. The process is beneficial to reduce the total amount of carbon dioxide in the atmosphere and reduce the environmental pressure caused by greenhouse gases, providing an effective method for National emission reduction.

It is the key to develop low cost catalysts with high activity, high selectivity and high stability in order to activate and oriented converse methane and carbon dioxide molecules which are inert active.

SUMMARY OF THE INVENTION

According to an aspect of the present application, a catalyst is provided in order to solve the problem that in high temperature reaction, the existing supported metal catalysts is apt to be sintered and coked leading to catalyst deactivation. As a high temperature stable catalyst for methane reforming with carbon dioxide, the catalyst can be used to produce syngas, realizing the emission reduction and recycling of carbon dioxide. Under atmospheric pressure and at 800° C., the supported metal catalyst with hierarchical pores shows excellent comprehensive catalytic performance. In addition to high activity and good selectivity, the catalyst has high stability, especially high resistance to sintering and carbon deposition.

The catalyst includes a support and an active component dispersed on/in the support; wherein the support is at least one selected from inorganic oxides and the support contains macropores and mesopores;

wherein the active component includes an active element; and the active element contains an iron group element which is at least one selected from ferrum, cobalt, nickel.

Preferably, the active element contains nickel.

Preferably, the average pore size of the macropores is greater than 50 nm, and the average pore size of the mesopores is in a range from 1 nm to 50 nm.

Preferably, the average pore size of the macropores is in a range from 1 μm to 2 μm. Preferably, the average pore size of the mesopores is in a range from 5 nm to 15 nm. Preferably, the specific surface area of the support is in a range from 100 $m^2/g$ to 350 $m^2/g$.

Compared with traditional mesoporous supports, there is a coordinating function between the support and the active component which makes the active component homogeneously dispersed and strongly loaded in/on the support, avoiding the sintering of active component metal particles in the process of catalytic reaction, restraining the formation of carbon deposition and prolonging the catalyst life. Inorganic oxides with the above-mentioned macropores and mesopores all can be used as the support of the catalyst in the present application, to solve the problem of high temperature sintering and carbon deposition, prolonging the life of the catalyst. Preferably, the support is at least one selected from aluminium oxides, silicon oxides, titanium oxides, zirconium oxides.

As a preferred embodiment, the active element contains a noble metal element. The noble metal element is at least one selected from gold, silver, ruthenium, rhodium, palladium, osmium, iridium, platinum. Further preferably, the noble metal element is at least one selected from platinum, ruthenium, gold, rhodium.

The synergy between noble metals and non-noble metals (iron group metal) makes the catalysts containing both noble metals and iron group metals possess more excellent overall catalytic performance than the catalyst only containing iron group metals. On the one hand, the introduction of noble metals active component is beneficial to the dispersion of non-noble metal components in the support, the further reduction of particle size of active metal component and the increase of the number of active sites, thus improving the catalytic conversion rate. On the other hand, the decrease of the metal particle size in the active component can increase the interaction of metal-support and improve the high temperature stability of the catalyst.

Preferably, the weight percentage content of the active component in the catalyst is in a range from 1% to 15%; and the weight percentage content of the active component is calculated according to the weight percentage content of the active element in the catalyst. Further preferably, the weight percentage content of the active component in the catalyst is in a range from 3.5% to 9%; and the weight percentage content of the active component is calculated according to the weight percentage content of the active element in the catalyst.

Preferably, the lower limit of the weight percentage content of iron group element belonging to the active element in the catalyst is selected from 1.0%, 1.5%, 1.76%, 2.0%, 2.76%, 3.0%, 3.5%, 3.84%, 4.0%, 4.09%, 4.05%, 4.12%, 4.16%, 4.18%, 4.5%, 4.74%, 4.8% or 4.9%, and the upper limit is selected from 5.0%, 5.1%, 5.41%, 5.45%, 6.24%, 6.49%, 7.0%, 8.0%, 9.0% or 10%; and the weight percentage content of iron group element in the catalyst is calculated according to the weight percentage content of the sum total of all the active iron group elements contained in the catalyst. Further preferably, the weight percentage content of iron group element belonging to the active element in the catalyst is in a range from 1% to 10%. Still further preferably, the weight percentage content of iron group element belonging to the active element in the catalyst is in a range from 3% to 6%.

Preferably, the lower limit of the weight percentage content of noble metal element belonging to the active element in the catalyst is selected from 0.1%, 0.2%, 0.24%, 0.29%, 0.3%, 0.31%, 0.33%, 0.35%, 0.37%, 0.38%, 0.39%, 0.40%, 0.42%, 0.43%, 0.45%, 0.5%, 0.54%, 0.55%, 0.6%, 0.7%, 0.8% or 0.9%, and the upper limit is selected from 1.0%, 1.07%, 1.5%, 2.0%, 2.5%, 2.93%, 3.0%, 3.5%, 4.0%, 4.5% or 5.0%; and the weight percentage content of noble metal element in the catalyst is calculated according to the weight percentage content of the sum total of all the noble elements contained in the catalyst. Further preferably, the weight percentage content of noble metal element belonging to the active element in the catalyst is in a range from 0.1% to 5%. Still further preferably, the weight percentage content of noble metal element belonging to the active element in the catalyst is in a range from 0.5% to 3%.

As an embodiment, the catalyst contains a modification component dispersed on/in the support; and the modification component includes a modification element; and the said modification element is at least one selected from alkali metal elements, alkaline earth metal elements, rare earth metal elements.

As an embodiment, the lower limit of the weight percentage content of the modification element in the catalyst is selected from 0.1%, 0.2%, 0.3%, 0.36%, 0.4%, 0.5%, 0.6%, 0.7%, 0.77%, 0.8%, 0.85%, 0.87%, 0.9%, 0.95% or 1%, and the upper limit is selected from 1.28%, 1.32%, 1.5%, 2.0%, 2.07%, 2.11%, 2.5%, 2.65%, 2.8%, 3%, 3.5%, 4.0%, 4.5%, 5.0%, 5.5%, 5.87%, 6.0%, 6.5%, 7.0%, 7.5%, 8.0%, 8.5% or 9.0%; and the weight percentage content of modification element in the catalyst is calculated according to the weight percentage content of the sum total of all the modification elements contained in the catalyst.

Preferably, the weight percentage content of alkali metal element in the catalyst is in a range from 0.1% to 10%. Further preferably, the lower limit of the weight percentage content of alkali metal element in the catalyst is selected from 0.1%, 0.5%, 0.87%, 0.97% or 1.0%, and the upper limit is selected from 1.32%, 1.5%, 2.0%, 2.11%, 2.5%, 3.0%, 3.5%, 4.0%, 4.5%, 4.85% or 5.0%. Still further preferably, the weight percentage content of alkali metal element in the catalyst is in a range from 0.1% to 5%.

Preferably, the weight percentage content of alkaline earth metal element in the catalyst is in a range from 0.1% to 10%. Further preferably, the lower limit of the weight percentage content of alkaline earth metal element in the catalyst is selected from 0.1%, 0.5%, 0.82%, 0.95% or 1%, and the upper limit is selected from 2.0%, 2.11%, 2.5%, 3.0%, 3.5%, 4.0%, 4.5%, 4.77%, 4.82% or 5.0%. Still further preferably, the weight percentage content of alkali metal element in the catalyst is in a range from 0.1% to 5%.

Preferably, the weight percentage content of rare earth metal element in the catalyst is in a range from 0.1% to 10%. Further preferably, the lower limit of the weight percentage content of rare earth metal element in the catalyst is selected from 0.1%, 0.2%, 0.3%, 0.36%, 0.5%, 0.6%, 0.8% or 1.0%, and the upper limit is selected from 1.26%, 1.38%, 1.39%, 1.4%, 1.5%, 2.0%, 2.11%, 2.5%, 3.0%, 3.5%, 4.0%, 4.5%, 5.0%, 5.07% or 5.87%. Still further preferably, the weight percentage content of rare earth metal element in the catalyst is in a range from 0.1% to 6%.

The active component on/in the support exists as zero-valence metal and/or compound containing the active metal element. Preferably, the active component on/in the support exists as zero valence metal.

The modification component on/in the support exists as compound containing the modification element or zero-valence metal. Preferably, the modification component on/in the support exists as compound containing the modification element.

The particle size distributions of the active component and the modification component are narrow, and the active component and the modification component are highly dispersed on/in the support with macropores and mesopores.

Preferably, the particle size of the active component dispersed on/in the support is in a range from 1 nm to 50 nm. Further preferably, the upper limit of the particle size of the active component dispersed on/in the support is selected from 15 nm, 20 nm, 25 nm, 30 nm, 35 nm, 40 nm, 45 nm or 50 nm, and the lower limit is selected from 1 nm, 5 nm or 10 nm. Still further preferably, particle size of the active component dispersed on/in the support is in a range from 1 nm to 15 nm.

Preferably, the particle size of the modification component dispersed on/in the support is in a range from 1 nm to 50 nm. Further preferably, the upper limit of the particle size of the modification component dispersed on/in the support is selected from 15 nm, 20 nm, 25 nm, 30 nm, 35 nm, 40 nm, 45 nm or 50 nm, and the lower limit is selected from 1 nm, 5 nm or 10 nm. Still further preferably, the particle size of the modification component dispersed on/in the support is in a range from 1 nm to 15 nm.

As a preferred embodiment, in the catalyst, the modification element includes a rare earth metal element.

As a preferred embodiment, in the catalyst, the active element includes a noble metal element and the modification element includes a rare earth metal element.

As a further preferred embodiment, in the catalyst, the active element is nickel and the modification element is a rare earth metal element.

As a still further preferred embodiment, in the catalyst, the active element is composed of platinum and nickel, and the modification element is composed of erbium and potassium;

wherein the molar ratio of platinum, cobalt, erbium and potassium is:

Pt:Co:Er:K=0.1%~5%:1%~10%:0.3%~5%:0.2%~5%.

According to another aspect of the present application, a method for preparing the catalyst is provided, which includes at least the steps as follows:

a) impregnating the support in a solution containing the active element; or impregnating the support in a solution containing the active element and the modification element;

b) separating to obtain the impregnated solid obtained in step a) which is dried, calcined under an air atmosphere and reduced by hydrogen to obtain the catalyst.

Preferably, in step a), the impregnation is an ultrasound impregnation; and the total immersion time is in a range from 24 hours to 96 hours, and accumulation of the ultrasonic time is in a range from 2 hours to 10 hours.

Preferably, in step a), the ultrasound impregnation is an intermittent ultrasound impregnation; and the total immersion time is in a range from 36 hours to 60 hours, and accumulation of the ultrasonic time is in a range from 2 hours to 6 hours.

Preferably, in step b), the drying is conducted at a temperature range from 60° C. to 200° C.

Preferably, in step b), the drying is vacuum drying conducted under a temperature range from 60° C. to 100° C. for a time range from 8 hours to 10 hours.

Further preferably, in step b), the temperature is raised from room temperature to a calcination temperature at a heating rate range from 1° C./min to 10° C./min to calcine the impregnated solid for no less than 1 hour, and the calcination temperature is in a range from 300° C. to 800° C.

Still further preferably, in step b) the temperature is raised from room temperature to a calcination temperature at a heating rate range from 1° C./min to 5° C./min to calcine the impregnated solid for a time range from 2 hours to 4 hours, and the calcination temperature is in a range from 500° C. to 700° C.

Preferably, in step b), the reduction by hydrogen is that the temperature is raised from room temperature to a reduction temperature at a heating rate range from 5° C./min to 20° C./min to reduce in hydrogen or a mixture of hydrogen and an inactive gas for no less than 1 hour, and the reduction temperature is in a range from 600° C. to 1000° C.; and flow velocity of hydrogen or the mixture of hydrogen and the inactive gas is in a range from 20 mL/min to 80 mL/min.

Further preferably, in step b), the reduction by hydrogen is that the temperature is raised from room temperature to a reduction temperature at a heating rate range from 5° C./min to 15° C./min to reduce in hydrogen for a time range from 1 hour to 2 hours, and the reduction temperature is in a range from 800° C. to 1000° C.; and the flow velocity of hydrogen is in a range from 20 mL/min to 40 mL/min. Preferably, the inactive gas is at least one selected from nitrogen, inert gases. Further preferably, the inactive gas is at least one selected from nitrogen, helium, argon.

According to another aspect of the present application, a method for producing syngas by reforming methane with carbon dioxide is provided, wherein a material containing methane and carbon dioxide contacts with a catalyst to produce syngas; and the catalyst is at least one selected from the above catalyst, the catalyst obtained using the above method.

Preferably, the reactants containing methane and carbon dioxide contacts with a catalyst to produce syngas at a reaction temperature from 600° C. to 900° C. and a reaction pressure from 0.1 MPa to 0.5 MPa; andin the reactants, the molar ratio of carbon dioxide to methane is as follows: carbon dioxide:methane is in a range from 0.5 to 2.

The beneficial effects of the present application include, but are not limited to the following effects:

(1) The catalyst provided by the present application has hierarchical supports; the hierarchical supports bring in macropore channels which increase the diffusion rate and the mass transfer rate of the medium. The synergistic effect between the hierarchical channels and the active components let the catalyst of the present application possess good anti-sintering property and good anti-coking property at the same time when used in high temperature catalytic reactions.

(2) When modified by adding rare earth elements, the activity of the catalyst provided in the present application can be effectively enhanced by adding the rare earth elements; the catalyst modified by rare earth elements brings higher catalytic conversion rate even in the case of lower active component load.

(3) When containing noble metals, except for applying iron group metals (at least one from iron, cobalt and nickel) as the first active component, the catalyst provided by the present application also introduce noble metals as the second active component. The synergy between noble metals and non-noble metals makes the catalysts containing both noble metals and iron group metals possess more excellent overall catalytic performance than the catalyst only containing iron group metals. On the one hand, the introduction of noble metals active component is beneficial to the dispersion of non-noble metal components in the support, the further reduction of particle size of active metal component and the increase of the number of active sites, thus improving the catalytic conversion rate. On the other hand, the decrease of the metal particle size in the active component can increase the interaction of metal-support and improve the high temperature stability of the catalyst. Moreover, compared with catalyst simply containing noble metals, the catalyst containing both iron group metals and noble metals lowers down the cost through the introduction of non-noble metals.

In conclusion, the catalyst containing both iron group metals and noble metals has a better cost efficiency and possesses a good application prospect. The catalyst provided by the present application can be further improved in the overall property through the introduction of modification components (alkali metal salts, alkaline-earth metal salts or rare earth metal salts).

(4) The catalyst provided by the present application can be used as the high temperature stable catalyst in the reaction of reforming methane with carbon dioxide, to produce syngas and thus realize the emission reduction and reutilization of carbon dioxide. Under atmospheric pressure and at 800° C., it shows excellent overall catalytic property (activity, selectivity and stability) and has high cost efficiency, and thus possesses a very good application prospect.

DETAILED DESCRIPTION OF THE EMBODIMENT

Figure 1:
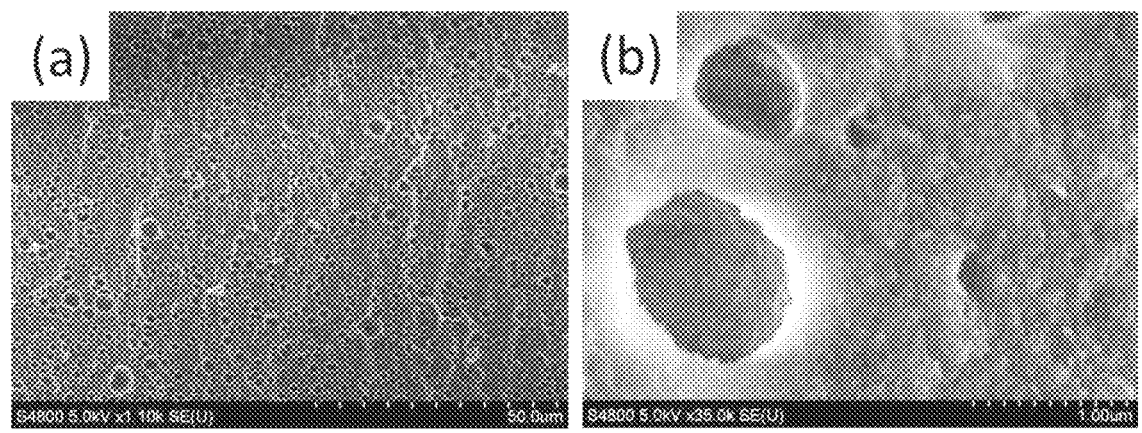
FIG. 1 are SEM images of the section of hierarchical pored aluminium oxide microsphere I; (a) is a 1100 times magnified SEM image; (b) is a 35000 times magnified SEM image.

The present invention will be further illustrated in combination with the following examples, but the present invention is not limited to these examples. Meanwhile, though the examples provide some conditions for producing catalysts, it does not mean that all these conditions must be fully met to achieve the goal.

If there is no special notification, raw materials used in the examples are purchased commercially and the devices are used with parameter settings recommended by the producer.

In the examples, SEM images of the samples are obtained using HITACHI S4800 scanning electron microscope; the transmission electron microscope images of the samples are obtained using FEI Company's F20 transmission electron microscope.

In the examples, the ultrasonic apparatus used for ultrasonic immersing is KQ300ED ultrasonic apparatus produced by Kunshan ultrasonic apparatus corporation limited.

In the examples, the loading quantities of iron group elements, noble metal elements, alkali metal elements, alkaline earth elements and rare earth elements are determined by plasma emission spectroscopy (ICP) on Ultima 2 apparatus produced by HORIBA JY Corporation in France.

In the examples, the detection of the product generated in the reaction of preparing syngas from reforming methane with carbon dioxide is carried out on SHIMAZU GC-2014 chromatograph (TDX-01 column).

In the examples, the specific surface area of the hierarchical aluminum oxide microsphere I is 197.91 $m^2/g$, the average pore size of the macropores is 1.52 and the average pore size of the mesopores is 9.80 nm; the specific surface area of the hierarchical aluminum oxide microsphere II is 200.45 $m^2/g$, the average pore size of the macropores is 1.61 μm, and the average pore size of the mesopores is 10.23 nm; the specific surface area of the hierarchical aluminum oxide microsphere III is 213.09 $m^2/g$, the average pore size of the macropores is 1.57 μm, and the average pore size of the mesopores is 11.08 nm.

Example 1 Preparation and Characterization of the Catalyst

Certain amounts of active component metal salts and/or modification component were dissolved in 10 mL of water to form an aqueous solution, and then 5 g of support was added for ultrasonic impregnation, and then solvent and surplus metal salts that had not been absorbed were filtered out. Support which absorbed the metal ion was dried under vacuum at 80° C. for 8 h, calcined under air atmosphere and reduced by hydrogen to obtain the catalyst.

Relationships between the number of the samples and specific experiment conditions, supports, raw materials are shown in Table 1.

TABLE 1

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-I-1 | hierarchical pored aluminium oxide microsphere I | nickel acetate (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Ni: 4.5% | 10-45 |
| CAT-I-2 | hierarchical pored aluminium oxide microsphere I | nickel acetate (2.5 mmol) | impregnation for 48 h; intermittent ultrasound for 4 h | calcination at 600° C. 4 h; heating rate: 1° C./min | high purity $H_2$, reduction at 900° C. for 4 h; heating rate: 10° C./min; flow rate: 30 mL/min | Ni: 3.55% | 10-40 |
| CAT-I-3 | hierarchical pored aluminium oxide microsphere I | nickel acetate (7.5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Ni: 5% | 10-50 |
| CAT-I-4 | hierarchical pored aluminium oxide microsphere I | nickel acetate (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Ni: 4.4% | 10-45 |
| CAT-I-5 | hierarchical pored aluminium oxide microsphere I | nickel acetate (5 mmol) | impregnation for 24 h; intermittent ultrasound for 10 h | calcination at 600° C. for 4 h; heating rate: 1° C./min | high purity $H_2$, reduction at 900° C. for 4 h; heating rate: 10° C./min; flow rate: 30 mL/min | Ni: 4.3% | 10-40 |
| CAT-I-6 | hierarchical pored aluminium oxide microsphere I | nickel acetate (5 mmol) | impregnation for 96 h; intermittent ultrasound for 2 h | calcination at 600° C. for 4 h; heating rate: 1° C./min | high purity $H_2$, reduction at 900° C. for 4 h; heating rate: 10° C./min; flow rate: 30 mL/min | Ni: 4.6% | 10-50 |
| CAT-I-7 | hierarchical pored aluminium oxide microsphere I | nickel acetate (5 mmol) | impregnation for 48 h; intermittent ultrasound for 4 h | calcination at 300° C. for 6 h; heating rate: 5° C./min | high purity $H_2$, reduction at 900° C. for 4 h; heating rate: 10° C./min; flow rate: 30 mL/min | Ni: 4.5% | 10-50 |
| CAT-I-8 | hierarchical pored aluminium oxide microsphere I | nickel acetate (5 mmol) | impregnation for 48 h; intermittent ultrasound for 4 h | calcination at 800° C. for 4 h; heating rate: 10° C./min | high purity $H_2$, reduction at 900° C. for 4 h; heating rate: 10° C./min; flow rate: 30 mL/min | Ni: 4.5% | 10-45 |
| CAT-I-9 | hierarchical pored aluminium oxide microsphere I | nickel acetate (5 mmol) | impregnation for 48 h; intermittent ultrasound for 4 h | calcination at 600° C. for 4 h; heating rate: 1° C./min | high purity $H_2$, reduction at 600° C. for 10 h; heating rate: 5° C./min; flow rate: 20 mL/min | Ni: 4.5% | 10-40 |
| CAT-I-10 | hierarchical pored aluminium oxide microsphere I | nickel acetate (5 mmol) | impregnation for 48 h; intermittent ultrasound for 4 h | calcination at 600° C. for 4 h; heating rate: 1° C./min | high purity $H_2$, reduction at 1000° C. for 2 h; heating rate: 20° C./min; flow rate: 80 mL/min | Ni: 4.5% | 10-50 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-I-11 | hierarchical pored aluminium oxide microsphere I | nickel acetate (5 mmol) | impregnation for 48 h; intermittent ultrasound for 4 h | calcination at 600° C. for 4 h; heating rate: 1° C./min | 30% $H_2$/70%$N_2$, mixed gas, reduction at 900° C. for 4 h; heating rate: 10° C. /min; flow rate: 50 mL/min | Ni: 4.5% | 10-45 |
| CAT-II-1 | hierarchical pored aluminium oxide microsphere II | nickel acetate (5 mmol) erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 3.82% Er: 2.05% | 10-35 |
| CAT-II-2 | hierarchical pored aluminium oxide microsphere II | nickel acetate (5 mmol) erbium nitrate (3 mmol) | impregnation for 48 h; intermittent ultrasound for 4 h | calcination at 600° C.for 4 h; heating rate: 1° C./min | high purity $H_2$, reduction at 900° C. for 4 h; heating rate: 10° C. /min; flow rate: 30 mL/min | Ni: 3.33% Er: 3.52% | 10-30 |
| CAT-II-3 | hierarchical pored aluminium oxide microsphere II | nickel acetate (5 mmol) erbium nitrate (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 2.91% Er: 8.66% | 10-25 |
| CAT-II-4 | hierarchical pored aluminium oxide microsphere II | nickel acetate (5 mmol) erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 3.76% Er: 2.13% | 10-30 |
| CAT-II-5 | hierarchical pored aluminium oxide microsphere II | nickel acetate (5 mmol) cerous nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 3.45% Ce: 3.37% | 10-30 |
| CAT-II-6 | hierarchical pored aluminium oxide microsphere II | nickel acetate (2.5 mmol) erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 2.04% Er: 2.26% | 10-25 |
| CAT-II-7 | hierarchical pored aluminium oxide microsphere II | nickel acetate (7.5 mmol) erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 5.63% Er: 1.95% | 10-40 |
| CAT-II-8 | hierarchical pored aluminium oxide microsphere II | nickel nitrate (5 mmol); erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Ni: 3.85% Er: 2.01% | 10-35 |
| CAT-II-9 | hierarchical pored aluminium oxide microsphere II | nickel acetate (5 mmol) erbium nitrate (1 mmol) | impregnation for 24 h; intermittent ultrasound for 10 h | calcination at 600° C. for 4 h; heating rate: 1° C./min | high purity $H_2$, reduction at 900° C. for 4 h; heating rate: 10° C. /min; flow rate: 30 mL/min | Ni: 3.65% Er: 1.93% | 10-30 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-II-10 | hierarchical pored aluminium oxide microsphere II | nickel acetate (5 mmol) erbium nitrate (1 mmol) | impregnation for 96 h; intermittent ultrasound for 2 h | calcination at 600° C. for 4 h; heating rate: 1° C./min | high purity $H_2$, reduction at 900° C. for 4 h; heating rate: 10° C. /min; flow rate: 30 mL/min | Ni: 4.15% Er: 2.13% | 10-45 |
| CAT-II-11 | hierarchical pored aluminium oxide microsphere II | nickel acetate (5 mmol) erbium nitrate (1 mmol) | impregnation: 48 h; intermittent ultrasound for 4 h | calcination at 300° C. for 6 h; heating rate: 5° C./min | high purity $H_2$, reduction at 900° C. for 4 h; heating rate: 10° C. /min; flow rate: 30 mL/min | Ni: 3.85% Er: 2.02% | 10-40 |
| CAT-II-12 | hierarchical pored aluminium oxide microsphere II | nickel acetate (5 mmol) erbium nitrate (1 mmol) | impregnation for 48 h; intermittent ultrasound for 4 h | calcination at 800° C. for 2 h; heating rate: 10° C./min | high purity $H_2$, reduction at 900° C. for 4 h; heating rate: 10° C. /min; flow rate: 30 mL/min | Ni: 3.91% Er: 2.10% | 10-30 |
| CAT-II-13 | hierarchical pored aluminium oxide microsphere II | nickel acetate (5 mmol) erbium nitrate (1 mmol) | impregnation for 48 h; intermittent ultrasound for 4 h | calcination at 600° C. for 4 h; heating rate: 1° C./min | high purity $H_2$, reduction 600° C. for 10 h; heating rate: 5° C. /min; flow rate: 20 mL/min | Ni: 3.85% Er: 2.06% | 10-35 |
| CAT-II-14 | hierarchical pored aluminium oxide microsphere II | nickel acetate (5 mmol) erbium nitrate (1 mmol) | impregnation for 48 h; intermittent ultrasound for 4 h | calcination at 600° C. for 4 h; heating rate: 1° C./min | high purity $H_2$, reduction at 1000° C. for 2 h; heating rate: 20° C. /min; flow rate: 80 mL/min | Ni: 3.84% Er: 2.03% | 10-40 |
| CAT-II-15 | hierarchical pored aluminium oxide microsphere II | nickel acetate (5 mmol) erbium nitrate (1 mmol) | impregnation for 48 h; intermittent ultrasound for 4 h | calcination at 600° C. for 4 h; heating rate: 1° C./min | 30% $H_2$/70% $N_2$, mixed gas, reduction at 900° C. for 4 h; heating rate: 10° C. /min; flow rate: 50 | Ni: 3.79% Er: 2.01% | 10-35 |
| CAT-III-1 | hierarchical pored aluminium oxide microsphere III | cobalt acetate (5 mmol); platinum tetrachloride(0.5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Co: 4.18% Pt: 0.43% | 5-15 |
| CAT-III-2 | hierarchical pored aluminium oxide microsphere III | cobalt acetate (5 mmol); platinum tetrachloride (0.5 mmol); erbium nitrate (0.5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Co: 4.09% Pt: 0.38% Er: 0.36% | 1-10 |
| CAT-III-3 | hierarchical pored aluminium oxide microsphere III | cobalt acetate (5 mmol); platinum tetrachloride (0.5 mmol); potassium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C. /min; flow rate: 30 mL/min | Co: 4.05% Pt: 0.33% K: 0.87% | 1-10 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-III-4 | hierarchical pored aluminium oxide microsphere III | cobalt acetate (5 mmol); platinum tetrachloride(0.5 mmol); mganesium chloride (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 4.12% Pt: 0.29% Mg: 0.95% | 1-10 |
| CAT-III-5 | hierarchical pored aluminium oxide microsphere III | cobalt acetate (5 mmol); platinum tetrachloride (0.5 mmol); erbium nitrate (1 mmol) potassium nitrate (1 mmol); magnesium chloride (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 4.16% Pt: 0.31% Er: 0.86% K: 0.97% Mg: 0.82% | 1-5 |
| CAT-III-6 | hierarchical pored aluminium oxide microsphere III | cobalt chloride (2 mmol); chloroauric acid (3 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 1.76% Au: 2.93% | 1-10 |
| CAT-III-7 | hierarchical pored aluminium oxide microsphere III | nickel acetate (5 mmol) platinum tetrachloride (1 mmol); | impregnation for 48 h; intermittent ultrasound for 4 h | calcination at 300° C. for 6 h; heating rate: 5° C./min | high purity $H_2$, reduction at 900° C. for 4 h; heating rate: 10° C./min; flow rate: 30 mL/min | Ni: 4.736% Pt: 0.54% | 1-10 |
| CAT-III-8 | hierarchical pored aluminium oxide microsphere III | iron nitrate (1 mmol); ruthenium acetylacetonate (2 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Fe: 2.76% Ru: 0.54% | 1-10 |
| CAT-III-9 | hierarchical pored aluminium oxide microsphere III | cobalt acetate (5 mmol); platinum tetrachloride (0.5 mmol); nickel acetate (2 mmol) | impregnation for 48 h; intermittent ultrasound for 4 h | calcination at 600° C. for 4 h; heating rate: 1° C./min | 30% $H_2$/70% $N_2$, mixed gas, reduction at 900° C. for 4 h; heating rate: 10° C./min; flow rate: 50 mL/min | Co: 4.02% Pt: 0.42% Ni: 1.39% | 1-10 |
| CAT-III-10 | hierarchical pored aluminium oxide microsphere III | cobalt acetate (5 mmol); platinum tetrachloride (0.5 mmol); nickel acetate (2 mmol) lanthanum nitrate (6 mmol) | impregnation for 48 h; intermittent ultrasound for 4 h | calcination at 600° C. for 4 h; heating rate: 1° C./min | 30% $H_2$/70% $N_2$, mixed gas, reduction at 900° C. for 4 h; heating rate: 10° C./min; flow rate: 50 mL/min | Co: 4.12% Pt: 0.37% Ni: 1.33% La: 5.87 | 1-10 |
| CAT-III-11 | hierarchical pored aluminium oxide microsphere | cobalt acetate (5 mmol); platinum | impregnation for 48 h; intermittent ultrasound for 4 h | calcination at 600° C. for 4 h; heating rate: 1° C./min | high purity $H_2$, reduction at 600° C. for 10 h; heating rate: 5° C./min; | Co: 4.03% Pt: 0.39% Fe: | 1-10 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| | III | tetrachloride (0.5 mmol); iron nitrate (3 mmol) | | | flow rate: 20 mL/min | 2.46% | |
| CAT-III-12 | hierarchical pored aluminium oxide microsphere III | cobalt acetate (4 mmol); platinum tetrachloride (1 mmol); iron nitrate (2 mmol) potassium chloride (5 mmol) | impregnation for 48 h; intermittent ultrasound for 4 h | calcination at 600° C. for 4 h; heating rate: 1° C./min | high purity H$_2$, reduction at 900° C. for 4 h; heating rate: 10° C./min; flow rate: 30 mL/min | Co: 3.23% Pt: 0.24% Fe: 1.87% K: 4.85% | 1-10 |
| CAT-III-13 | hierarchical pored aluminium oxide microsphere III | cobalt acetate (5 mmol); platinum tetrachloride (0.5 mmol); iron nitrate (1.5 mmol) nickel acetate (1 mmol) | impregnation for 48 h; intermittent ultrasound for 4 h | calcination at 800° C. for 2 h; heating rate: 10° C./min | high purity H$_2$, reduction at 900° C. for 4 h; heating rate: 10° C./min; flow rate: 30 mL/min | Co: 3.93% Pt: 0.33% Fe: 1.23% Ni: 1.08% | 1-10 |
| CAT-III-14 | hierarchical pored aluminium oxide microsphere III | cobalt acetate (3 mmol); platinum tetrachloride (2 mmol); iron nitrate (0.5 mmol) nickel acetate (1 mmol) magnesium nitrate (5 mmol) | impregnation for 48 h; intermittent ultrasound for 4 h | calcination at 600° C. for 4 h; heating rate: 1° C./min | high purity H$_2$, reduction at 1000° C. for 2 h; heating rate: 20° C./min; flow rate: 80 mL/min | Co: 2.75% Pt: 1.07% Fe: 0.34% Ni: 0.75% Mg: 4.77% | 1-10 |
| CAT-III-15 | hierarchical pored aluminium oxide microsphere III | iron nitrate (6 mmol) Ruthenium acetylacetonate (0.2 mmol); potassium chloride (2 mmol) | impregnation for 48 h; intermittent ultrasound for 4 h | calcination at 600° C. for 4 h; heating rate: 1° C./min | high purity H$_2$, reduction at 1000° C. for 2 h; heating rate: 20° C./min; flow rate: 80 mL/min | Fe: 3.93% Ru: 0.75% K: 2.11% | 1-10 |
| CAT-III-16 | hierarchical pored aluminium oxide microsphere III | iron nitrate (6 mmol) rhodium chloride (0.5 mmol); lanthanum nitrate (2 mmol) | impregnation for 48 h; intermittent ultrasound for 4 h | calcination at 600° C. for 4 h; heating rate: 1° C./min | high purity H$_2$, reduction at 1000° C. for 2 h; heating rate: 20° C./min; flow rate: 80 mL/min | Fe: 3.93% Rh: 0.36% La: 2.11% | 5-15 |
| CAT-III-17 | hierarchical pored aluminium oxide microsphere III | cobalt acetate (5 mmol); | impregnation for 48 h; intermittent ultrasound for 4 h | calcination at 600° C. ° C. for 4 h; heating rate: 1° C./min | high purity H$_2$, reduction at 900° C. for 4 h; heating rate: 10° C./min; flow rate: 30 mL/min | Co: 4.42% | 10-35 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-III-18 | hierarchical pored aluminium oxide microsphere III | cobalt acetate (5 mmol); erbium acetate (1 mmol) | impregnation for 48 h; intermittent ultrasound for 4 h | calcination at 600° C. ° C. for 4 h; heating rate: 1° C./min | high purity $H_2$, reduction at 900° C. for 4 h; heating rate: 10° C./min; flow rate: 30 mL/min | Co: 4.05% Er: 1.39% | 10-40 |
| CAT-III-19 | hierarchical pored aluminium oxide microsphere III | cobalt acetate (5 mmol); lanthanum nitrate (5 mmol) | impregnation for48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 4.26% La: 5.07% | 5-30 |
| CAT-III-20 | hierarchical pored aluminium oxide microsphere III | cobalt acetate (5 mmol); potassium chloride (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 4.07% K: 4.85% | 5-35 |
| CAT-III-21 | hierarchical pored aluminium oxide microsphere III | cobalt acetate (5 mmol); magnesium chloride (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Co: 4.36% Mg: 4.82% | 5-35 |
| CAT-III-22 | hierarchical pored aluminium oxide microsphere III | cobalt sulfate (3 mmol); | impregnation for 48 h; intermittent ultrasound for 4 h | calcination at 300° C. for 6 h; heating rate: 5° C./min | high purity $H_2$, reduction at 900° C. for 4 h; heating rate: 10° C./min; flow rate: 30 mL/min | Co: 2.85% | 10-40 |
| CAT-III-23 | hierarchical pored aluminium oxide microsphere III | cobalt nitrate (5 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Fe: 4.63% | 10-35 |
| CAT-III-24 | hierarchical pored aluminium oxide microsphere III | iron nitrate (6 mmol) nickel acetate (2 mmol) | impregnation for 48 h; intermittent ultrasound for 4 h | calcination at 600° C. for 4 h; heating rate: 1° C./min | 30% $H_2$/70% $N_2$, mixed gas, reduction at 900° C. for 4 h; heating rate: 10° C./min; flow rate: 50 mL/min | Fe: 3.89% Ni: 1.24% | 10-35 |
| CAT-III-25 | hierarchical pored aluminium oxide microsphere III | iron nitrate (6 mmol) cobalt acetate (2 mmol) | impregnation for 48 h; intermittent ultrasound for 4 h | calcination at 600° C. for 4 h; heating rate: 1° C./min | 30% $H_2$/70% $N_2$, mixed gas, reduction at 900° C. for 4 h; heating rate: 10° C./min; flow rate: 50 mL/min | Fe: 4.79% Co: 1.24% | 10-40 |
| CAT-III-26 | hierarchical pored aluminium oxide microsphere III | iron nitrate (2 mmol) cobalt acetate (2 mmol); nickel acetate (2 mmol) | impregnation for 48 h; intermittent ultrasound for 4 h | calcination at 600° C. for 4 h; heating rate: 1° C./min | high purity $H_2$, reduction at 600° C. for 10 h; heating rate: 5° C./min; flow rate: 20 mL/min | Fe: 1.84% Co: 1.92% Er: 1.68% | 10-45 |

TABLE 1-continued

| Sample | Support | Metal salts and the dosage | Time of ultrasonic impregnation | Calcination Condition | Hydrogen-Reduction Condition | Percentage composition of metals | Range of particle size (nm) |
|---|---|---|---|---|---|---|---|
| CAT-III-27 | hierarchical pored aluminium oxide microsphere III | iron nitrate (2.5 mmol) cobalt acetate (3 mmol); erbium nitrate (1 mmol) | impregnation for 48 h; intermittent ultrasound for 4 h | calcination at 600° C. for 4 h; heating rate: 1° C./min | high purity $H_2$, reduction at 900° C. for 4 h; heating rate: 10° C./min; flow rate: 30 mL/min | Fe: 2.04% Co: 1.97% Er: 1.26% | 10-35 |
| CAT-III-28 | hierarchical pored aluminium oxide microsphere III | cobalt acetate (3 mmol) nickel acetate (3 mmol); potassium chloride (1 mmol) | impregnation for 48 h; intermittent ultrasound for 4 h | calcination at 800° C. for 2 h; heating rate: 10° C./min | high purity $H_2$, reduction at 900° C. for 4 h; heating rate: 10° C./min; flow rate: 30 mL/min | Fe: 2.91% Ni: 2.39% K: 1.32% | 10-35 |
| CAT-III-29 | hierarchical pored aluminium oxide microsphere III | iron nitrate (6 mmol) magnesium chloride (2 mmol); erbium nitrate (1 mmol) | impregnation for 48 h; intermittent ultrasound for 4 h | calcination at 600° C. for 4 h; heating rate: 1° C./min | high purity $H_2$, reduction at 1000° C. for 2 h; heating rate: 20° C./min; flow rate: 80 mL/min | Fe: 3.93% Mg: 2.11% Er: 1.38% | 5-35 |

Example 2 Characterization of the Samples

Scanning electron microscopes are used for the characterizations of hierarchical pored aluminium oxide microsphere I, hierarchical pored aluminium oxide microsphere II and hierarchical pored aluminium oxide microsphere III. As the typical sample, the cross-sectional SEM images of the hierarchical pored aluminium oxide microsphere I were shown in FIG. 1. It can be seen that hierarchical pored aluminium oxide microspheres possess micron-sized macropores and nanopores. The SEM images of hierarchical pored aluminium oxide microsphere II and hierarchical pored aluminium oxide microsphere III are similar with FIG. 1.

Transmission electron microscope was used to observe the particle sizes of active components and modification components rare earth particles on the catalyst. The results of the particle sizes are shown in Table 1.

ICP was used to determine the percentage contents of iron group elements, noble metal elements, alkali metal elements, alkaline earth metal elements and rare earth elements in the samples. The results are shown in Table 1.

Example 3 Catalytic Properties of Sample CAT-I-1~CAT-I-11

0.2 g of catalyst CAT-I-1 was put into a fixed bed reactor with an inner diameter of 1 cm, and reduced online by hydrogen. The temperature of the reactor was adjusted to the reaction temperature subsequently. The reducing gas was switched to a mixed gas of $CO_2$ and $CH_4$, wherein $N_2$ was used as an internal standard. The reacted gas was cooled down and the contents of each substance therein were determined by gas chromatography. Conversions of $CO_2$ and $CH_4$ were calculated.

Relationships between reaction conditions and the conversions of $CO_2$ and $CH_4$ are shown in Table 2.

Figure 2:
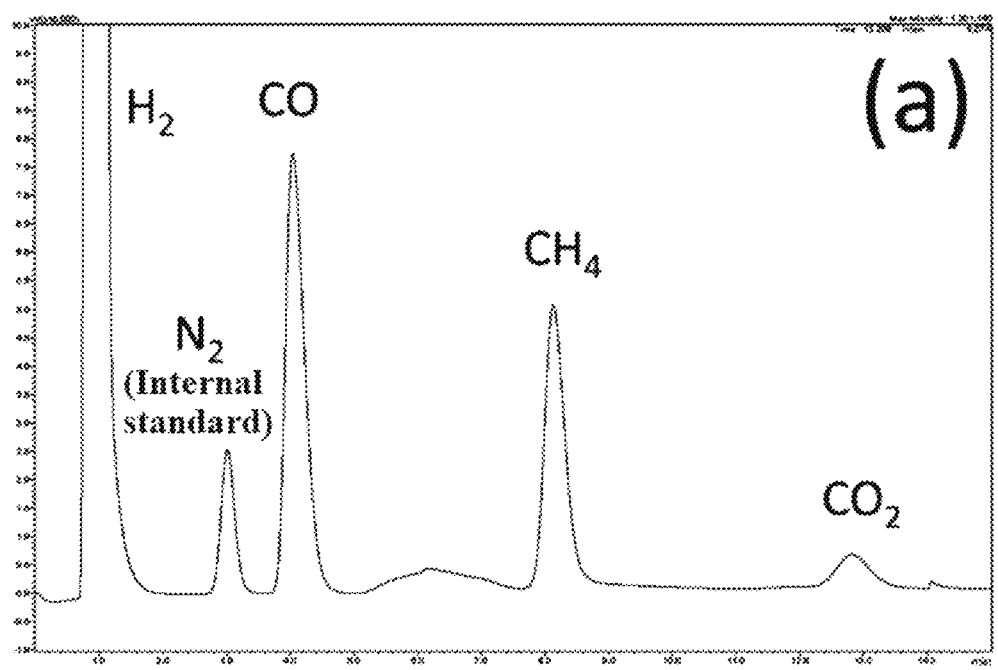
FIG. 2 are chromatography test results of the product of the reforming methane reaction with carbon dioxide in which sample CAT-I-1 was used; (a) is the testing result from thermal conductivity detector (TCD); (b) is the testing result from flame ionization detector (FID).
Figure 2:
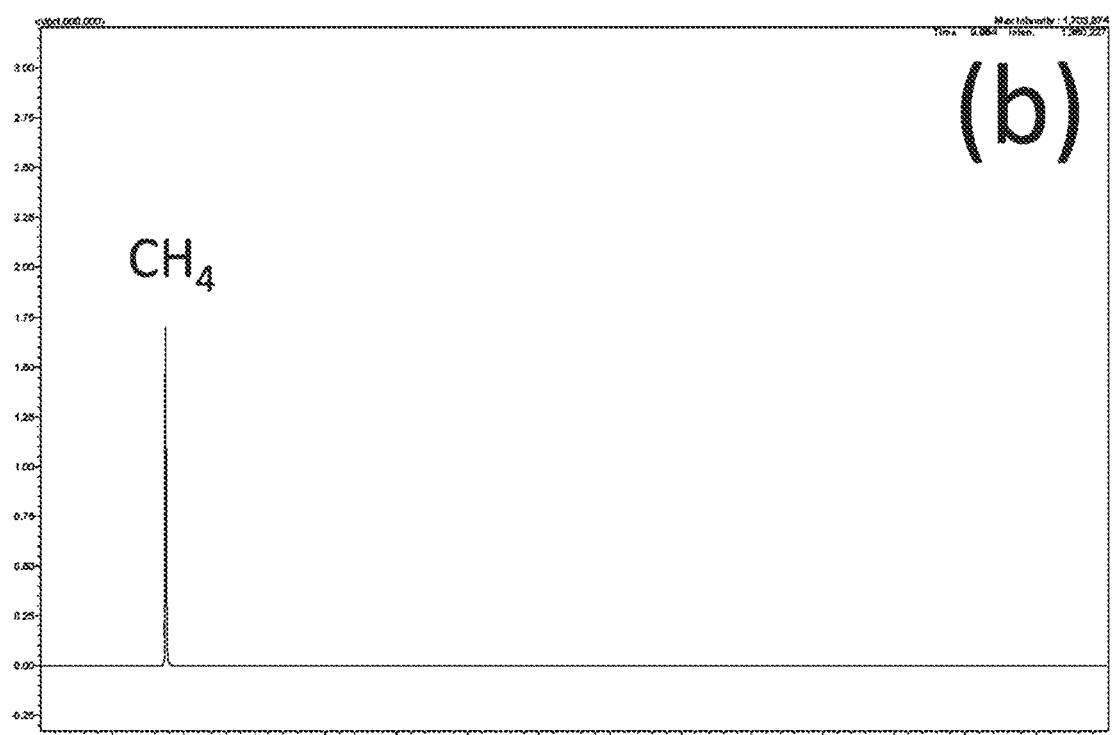

When the reaction condition was A, the chromatography results of the tail gas was shown in FIG. 2. It can be seen from FIG. 2 that, the catalyst provided by the present application has good selectivity, and the product was mainly consisted of hydrogen and carbon monoxide, which are the major constituents of syngas.

TABLE 2

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| A | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 800° C. | 0.1 MPa | 82.52% | 64.91% |

TABLE 2-continued

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| B | 80% $H_2$/20% $N_2$ mixed gas, reduction at 850° C. for 2 h; heating rate: 20° C./min flow rate: 30 mL/min | $CO_2$: $CH_4$: $N_2$ = 47: 47: 6 flow rate: 30 mL/min | 800° C. | 0.1 MPa | 83.64% | 65.57% |
| C | high purity $H_2$, reduction at 800° C. for 1 h; heating rate: 10° C./min; flow rate: 15 mL/min | $CO_2$: $CH_4$: $N_2$ = 31: 62: 7 flow rate: 50 mL/min | 800° C. | 0.1 MPa | 90.37% | 38.28% |
| D | high purity $H_2$, reduction at 800° C. for 1 h; heating rate: 10° C./min; flow rate: 15 mL/min | $CO_2$: $CH_4$: $N_2$ = 62: 31: 6 flow rate: 50 mL/min | 800° C. | 0.1 MPa | 41.34% | 92.46% |
| E | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 600° C. | 0.1 MPa | 18.37% | 8.41% |
| F | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 850° C. | 0.1 MPa | 92.97% | 84.13% |
| G | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 800° C. | 0.5 MPa | 93.65% | 75.39% |

Conversion rates of $CO_2$ and $CH_4$ are calculated by the following equation respectively:

$$CO_2\% = \frac{F_{CO2,in} - F_{CO2,out}}{F_{CO2,in}} \times 100\%$$

$$CH_4\% = \frac{F_{CH4,in} - F_{CH4,out}}{F_{CH4,in}} \times 100\%$$

wherein $F_{CO2, in}$ and $F_{CO2, out}$ are respectively volume flows of $CO_2$ in the raw gas and reaction tail gas; $F_{CH4, in}$ and $F_{CH4, out}$ are respectively volume flows of $CH_4$ in the reactant and the product.

Under the same reaction conditions, catalyst CAT-I-2~CAT-I-11 provided similar results as CAT-I-1, and the conversion rates of $CO_2$ and $CH_4$ vary in a range of ±10% on the basis of the difference in the preparation methods of the catalysts.

Example 4 Evaluation on the Catalyst Stability of Samples CAT-I-1~CAT-I-11

Figure 3:
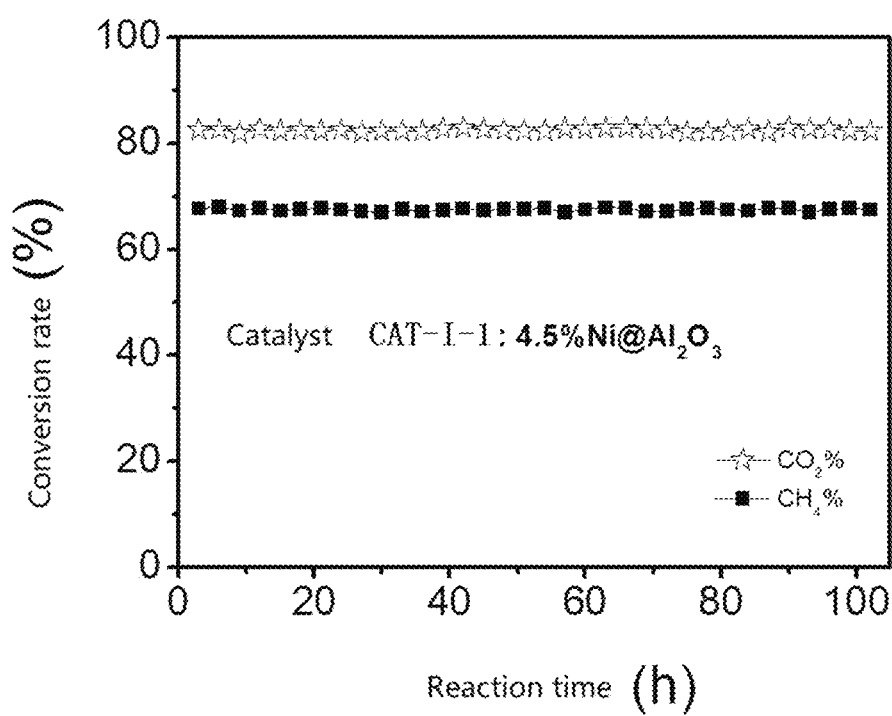
FIG. 3 is the testing result of catalytic stability of sample CAT-I-1.

0.2 g of catalyst CAT-I-1 was put into a fixed bed reactor with an inner diameter of 1 cm. The evaluation on the catalyst stability is carried out under the reaction condition A in Example 3, and the result is shown in FIG. 3. It can be seen from FIG. 3 that, CAT-I-1 possesses excellent stability under atmospheric pressure and at 800° C., and the conversion rates of carbon dioxide and methane nearly maintain unchanged within the first 100 hours of reaction.

Figure 4:
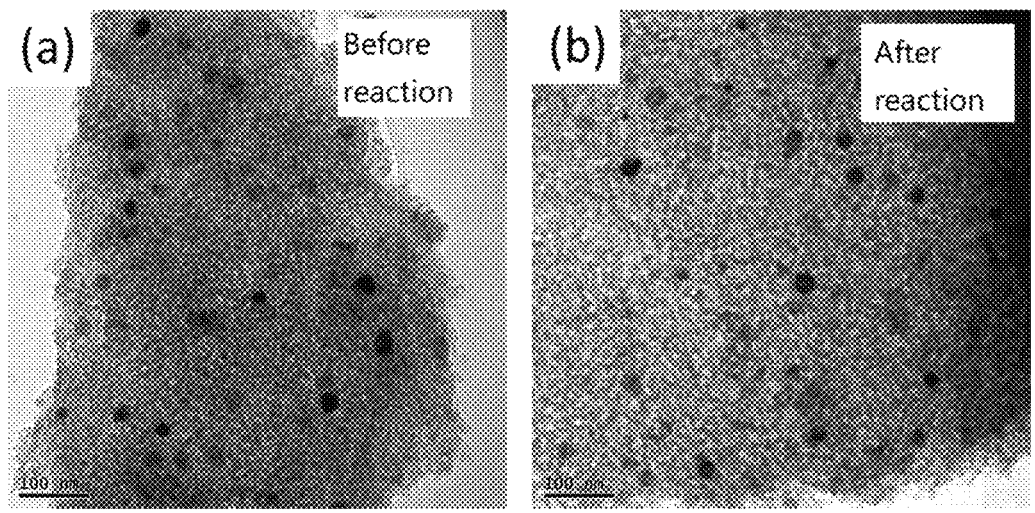
FIG. 4 are transmission electron microscope images of CAT-I-1 tested before and after the reaction; (a) is the transmission electron microscopy image of CAT-I-1 tested before the reaction; (b) is the transmission electron microscopy image of CAT-I-1 tested after reacting for 102 hours at 800° C.

Transmission electron microscope images of CAT-I-1 tested before and after the reaction are shown in FIG. 4. FIG. 4(a) is the transmission electron microscopy image of CAT-I-1 tested before the reaction; FIG. 4(b) is the transmission electron microscopy image of CAT-I-1 tested after reacting for 102 hours at 800° C. It can be seen from FIG. 4 that, nickel particles, as the active component on the catalyst, nearly did not change after the reaction and had not been sintered; moreover, no deposited carbon was generated in the catalyst within 102 hours.

Under the same reaction conditions, the results of evaluation on the catalyst stability of CAT-I-2~CAT-I-11 are similar to that of CAT-I-I, and the conversion rates of carbon dioxide and methane nearly maintain unchanged within the first 100 hours. Transmission electron microscope images of samples CAT-I-2~CAT-I-11 before and after 102 hours of reaction at 800° C. show the similar comparison results as CAT-1-1. The nickel particle had not been sintered, and no deposited carbon was generated in the catalyst.

Example 5 Preparation of Catalyst DCAT-II-1

5 mmol of nickel acetate was dissolved in 10 mL water to form a solution, and 5 g of hierarchical pored aluminium oxide microsphere II was added. After being impregnated for 48 h (ultrasonic was conducted for 4 h intermittently), water and surplus nickel acetate that had not been absorbed were filtered out. After being vacuum dried at 80° C. for 8 h, aluminium oxide absorbed the nickel ion was calcinated at 600° C. for 4 h in air atmosphere (the heating rate was 1° C./min), followed by reduction for 4 h at 900° C. using high purity hydrogen (the heating rate was 10° C./min). The obtained sample was denoted as catalyst DCAT-II-1. The mass percentage content of nickel in DCAT-II-1 is 4.25%.

Example 6 Comparison on the Activity Between CAT-II-1 and DCAT-II-1

Figure 5:
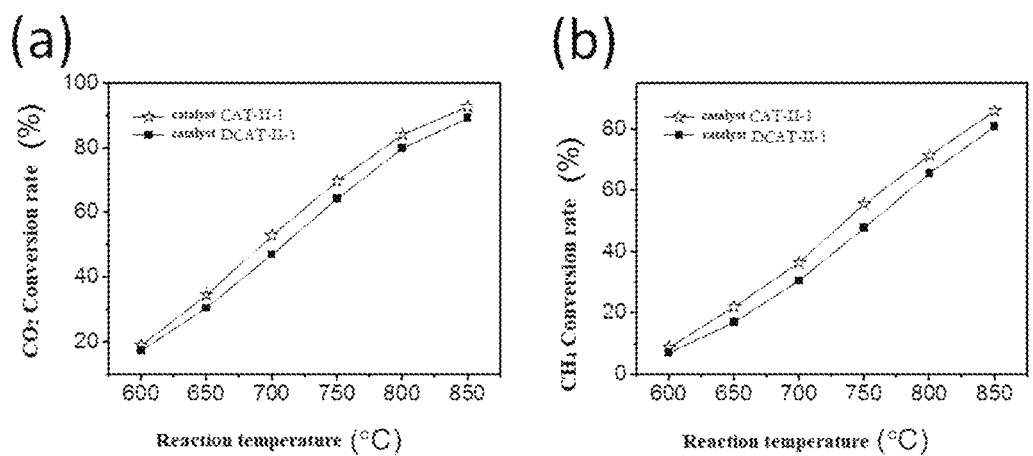
FIG. 5 are figures comparing the catalytic activity between samples CAT-II-1 and DCAT-II-1; (a) shows the conversion rate of carbon dioxide; (b) shows the conversion rate of methane.

Each 0.2 g of catalyst samples CAT-II-1 and DCAT-II-1 was put into a fixed bed reactor with inner diameter of 1 cm, and high purity $H_2$ with a flow rate of 5 mL/min was continuously introduced into the reactor, and then the reactor was heated to 800° C. with a heating rate of 10° C./min and hydrogen online reduction of the catalyst was carried out for 1 h. 30 mL/min of raw gas (molar ratio of $CO_2$:$CH_4$:$N_2$=47:47:6) was introduced, and the reaction pressure was kept at 0.1 MPa, and the temperature was adjusted to 600° C., then the reaction temperature was raised gradually to 850° C. with a heating rate of 10° C./min. The comparison of the conversion rates of carbon dioxide and methane on catalyst CAT-II-1 and DCAT-II-1 at different reaction temperature was shown in FIG. 5.

Mass percentage content of nickel in CAT-II-1 is 3.82%; mass percentage content of nickel in CAT-II-1 is 4.25%. It can be seen from FIG. 5 that being introduced with modification rare earth elements, the catalyst CAT-II-1 with a lower content of the active component, had a better perform on the conversion rates of carbon dioxide and methane than DCAT-II-1 with higher component content.

Example 7 Evaluation on the Catalytic Properties of Samples CAT-II-1~CAT-II-15

0.2 g of catalyst CAT-II-1 was put into a fixed bed reactor with an inner diameter of 1 cm, after hydrogen online reduction, the temperature of the reactor was adjusted to the reaction temperature. The gas was switched to a mixed gas of $CO_2$ and $CH_4$, wherein $N_2$ was used as an internal standard. The reacted gas was cooled down and the contents of each substance were determined by gas chromatography. Conversions of $CO_2$ and $CH_4$ were calculated.

Relationships between reaction conditions and the conversions of $CO_2$ and $CH_4$ are shown in Table 3.

Figure 6:
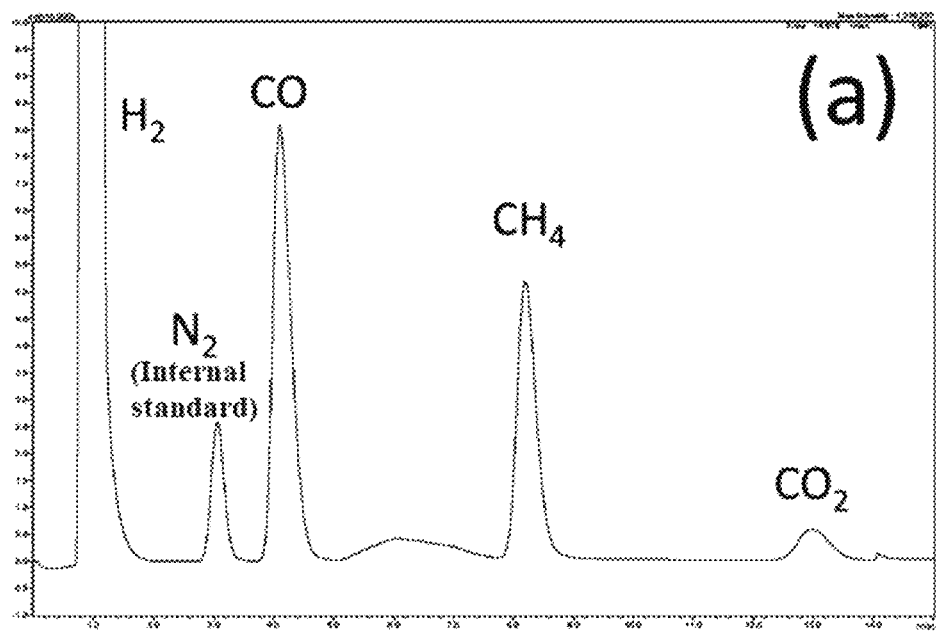
FIG. 6 are chromatography test results of the product of the reforming methane reaction with carbon dioxide in which sample CAT-II-1 was used; (a) is the testing result from thermal conductivity detector (TCD); (b) is the testing result from flame ionization detector (FID).
Figure 6:
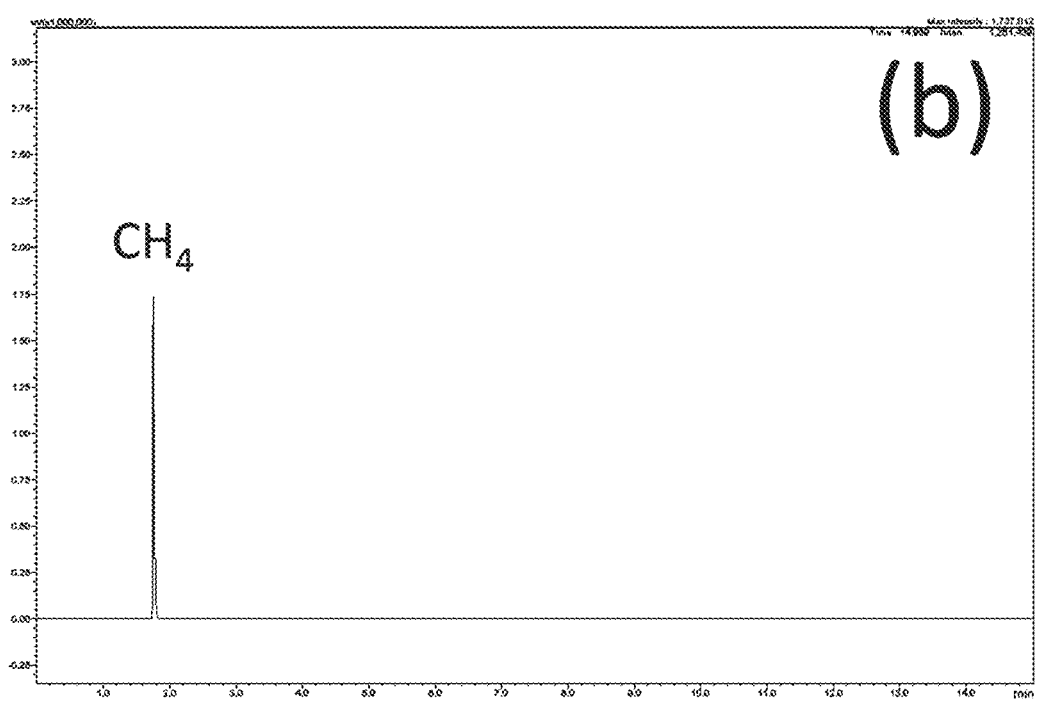

When the reaction condition was A, the chromatography results of the tail gas were shown in FIG. 6. It can be seen from FIG. 6 that, the catalyst provided by the present application has good selectivity, and the product was mainly consisted of hydrogen and carbon monoxide, which are the major constituents of syngas.

TABLE 3

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| A | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 800° C. | 0.1 MPa | 83.15% | 71.34% |
| B | 80% $H_2$/20% $N_2$ mixed gas, reduction at 850° C. for 2 h; heating rate: 20° C./min flow rate: 30 mL/min | $CO_2$: $CH_4$: $N_2$ = 47: 47: 6 flow rate: 30 mL/min | 800° C. | 0.1 MPa | 85.23% | 73.15% |
| C | high purity $H_2$, reduction at 800° C. for 1 h; heating rate: 10° C./min; flow rate: 15 mL/min | $CO_2$: $CH_4$: $N_2$ = 31: 62: 7 flow rate: 50 mL/min | 800° C. | 0.1 MPa | 91.35% | 39.61% |
| D | high purity $H_2$, reduction at 800° C. for 1 h; heating rate: 10° C./min; flow rate: 15 mL/min | $CO_2$: $CH_4$: $N_2$ = 62: 31: 6 flow rate: 50 mL/min | 800° C. | 0.1 MPa | 53.72% | 89.23% |
| E | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 600° C. | 0.1 MPa | 23.35% | 15.81% |

TABLE 3-continued

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| F | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 850° C. | 0.1 MPa | 93.25% | 85.62% |
| G | high purity $H_2$, reduction at 800° C. for 1 h; heating rate: 10° C./min; flow rate: 15 mL/min | $CO_2$: $CH_4$: $N_2$ = 47: 47: 6 flow rate: 30 mL/min | 800° C. | 0.5 MPa | 92.34% | 85.36% |

Conversion rates of $CO_2$ and $CH_4$ are calculated by the following equation respectively:

$$CO_2\% = \frac{F_{CO2,in} - F_{CO2,out}}{F_{CO2,in}} \times 100\%$$

$$CH_4\% = \frac{F_{CH4,in} - F_{CH4,out}}{F_{CH4,in}} \times 100\%$$

wherein $F_{CO2, in}$ and $F_{CO2, out}$ are respectively volume flows of $CO_2$ in the raw gas and reaction tail gas; $F_{CH4, in}$ and $F_{CH4, out}$ are respectively volume flows of $CH_4$ in the reactant and the product.

Under the same reaction conditions, catalyst CAT-II-2~CAT-II-15 provided similar results as CAT-II-1, and the conversion rates of $CO_2$ and $CH_4$ vary in a range of ±10% on the basis of the difference in the preparation methods of the catalysts.

Example 8 Evaluation on the Stability of Samples CAT-II-1~CAT-II-15

Figure 7:
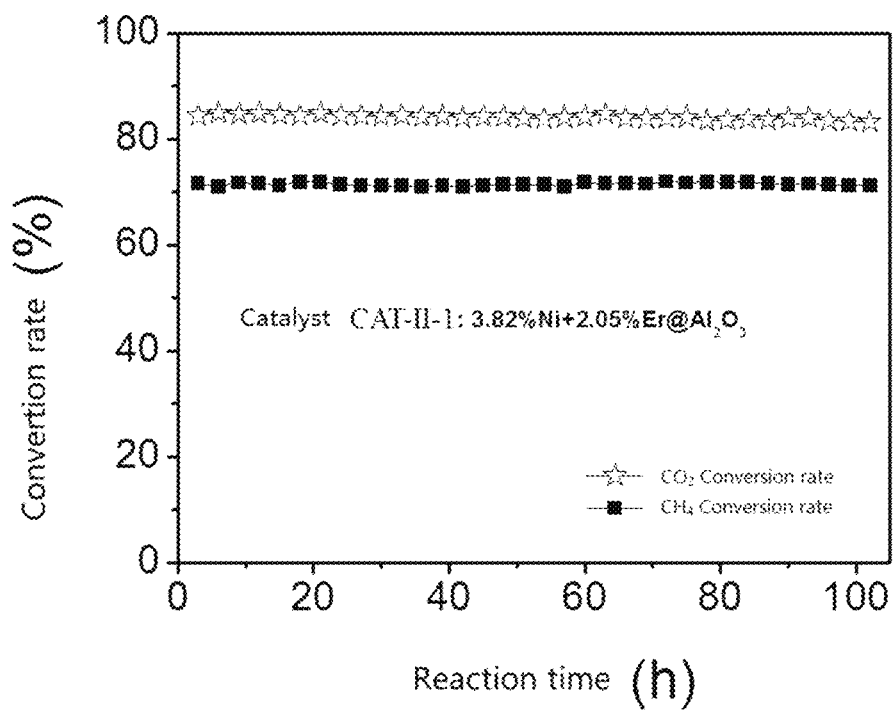
FIG. 7 is the testing result of catalytic stability of sample CAT-II-1.

0.2 g of catalyst CAT-II-1 was put into a fixed bed reactor with an inner diameter of 1 cm. The evaluation on the catalyst stability was carried out under the reaction condition A in Example 7. The result is shown in FIG. 7. It can be seen from FIG. 7 that, the catalyst provided by the present application possesses excellent stability under atomospheric pressure and at 800° C., and the conversion rates of carbon dioxide and methane nearly maintain unchanged within the first 100 hours of reaction.

Figure 8:
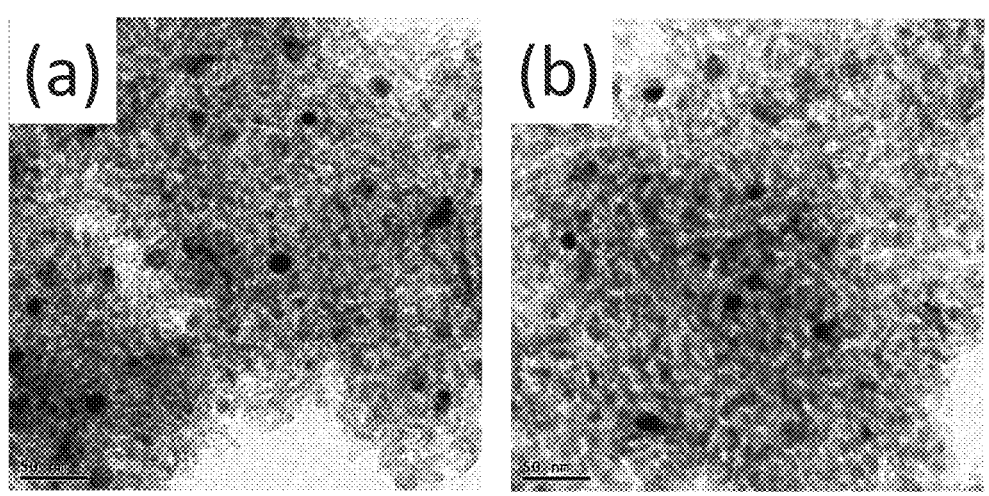
FIG. 8 are transmission electron microscope images of CAT-II-1 tested before and after the reaction; (a) is the transmission electron microscopy image of CAT-II-1 tested before the reaction; (b) is the transmission electron microscopy image of CAT-II-1 tested after reacting for 102 hours at 800° C.

Transmission electron microscope images of CAT-II-1 tested before and after the reaction are shown in FIG. 8. FIG. 8(a) is the transmission electron microscopy image of CAT-II-1 tested before the reaction; FIG. 8(b) is the transmission electron microscopy image of CAT-II-1 tested after reacting for 102 hours at 800° C. It can be seen from FIG. 8 that, nickel particles, the active component on the catalyst, nearly did not change after the reaction and had not been sintered; moreover, no deposited carbon was generated in the catalyst within 102 hours.

Under the same reaction conditions, the results of evaluation on the catalyst stability of CAT-II-2~CAT-II-15 are similar to that of CAT-II-I, and the conversion rates of carbon dioxide and methane nearly maintain unchanged within the first 100 hours. Transmission electron microscopy images of samples CAT-II-2~CAT-I-15 before and after 102 hours of reaction at 800° C. show the similar comparison results as CAT-II-1, the nickel particle had not been sintered and no deposited carbon was generated in the catalyst.

Example 9 Evaluation on the Catalytic Properties of Samples CAT-III-1~CAT-III-2

0.2 g of catalyst CAT-III-1 was put into a fixed bed reactor with an inner diameter of 1 cm, after hydrogen online reduction, the temperature of the reactor was adjusted to the reaction temperature. The reduction gas was switched to a mixed gas of $CO_2$ and $CH_4$, wherein $N_2$ was used as an internal standard. The reacted gas was cooled down and the contents of each substance therein were determined by gas chromatography. Conversions of $CO_2$ and $CH_4$ were calculated.

Relationships between reaction conditions and the conversions of $CO_2$ and $CH_4$ are shown in Table 4.

TABLE 4

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| A | high purity $H_2$, 800° C. reduction 1 h; heating rate: 10° C./min; flow rate: 15 mL/min | $CO_2$: $CH_4$: $N_2$ = 47: 47: 6 flow rate: 30 mL/min | 800° C. | 0.1 MPa | 88.43% | 75.98% |

TABLE 4-continued

| Reaction condition No. | Conditions for hydrogen online reduction | Composition and flow rate of raw gas | Reaction temperature | Reaction pressure | Conversion rate of $CO_2$ | Conversion rate of $CH_4$ |
|---|---|---|---|---|---|---|
| B | 80% $H_2$/20% $N_2$ mixed gas, 850° C. reduction 2 h; heating rate: 20° C./min flow rate: 30 mL/min | $CO_2$: $CH_4$: $N_2$ = 47: 47: 6 flow rate: 30 mL/min | 800° C. | 0.1 MPa | 87.98% | 74.28% |
| C | high purity $H_2$, 800° C. reduction 1 h; heating rate: 10° C./min; flow rate: 15 mL/min | $CO_2$: $CH_4$: $N_2$ = 31: 62: 7 flow rate: 50 mL/min | 800° C. | 0.1 MPa | 93.87% | 42.87% |
| D | high purity $H_2$, 800° C. reduction 1 h; heating rate: 10° C./min; flow rate: 15 mL/min | $CO_2$: $CH_4$: $N_2$ = 62: 31: 6 flow rate: 50 mL/min | 800° C. | 0.1 MPa | 62.76% | 92.98% |
| E | high purity $H_2$, 800° C. reduction 1 h; heating rate: 10° C./min; flow rate: 15 mL/min | $CO_2$: $CH_4$: $N_2$ = 47: 47: 6 flow rate: 30 mL/min | 600° C. | 0.1 MPa | 29.90% | 18.26% |
| F | high purity $H_2$, 800° C. reduction 1 h; heating rate: 10° C./min; flow rate: 15 mL/min | $CO_2$: $CH_4$: $N_2$ = 47: 47: 6 flow rate: 30 mL/min | 900° C. | 0.1 MPa | 95.47% | 87.86% |
| G | high purity $H_2$, 800° C. reduction 1 h; heating rate: 10° C./min; flow rate: 15 mL/min | $CO_2$: $CH_4$: $N_2$ = 47: 47: 6 flow rate: 30 mL/min | 800° C. | 0.5 MPa | 94.27% | 86.73% |

Conversion rates of $CO_2$ and $CH_4$ are calculated by the following equation respectively:

$$CO_2\% = \frac{F_{CO2,in} - F_{CO2,out}}{F_{CO2,in}} \times 100\%$$

$$CH_4\% = \frac{F_{CH4,in} - F_{CH4,out}}{F_{CH4,in}} \times 100\%$$

wherein $F_{CO2, in}$ and $F_{CO2, out}$ are respectively volume flows of $CO_2$ in the raw gas and reaction tail gas; $F_{CH4, in}$ and $F_{CH4, out}$ are respectively volume flows of $CH_4$ in the reactant and the product.

Under the same reaction conditions, catalyst CAT-III-2~CAT-III-29 provided similar results as CAT-III-1, and the conversion rates of $CO_2$ and $CH_4$ vary in a range of ±20% on the basis of the difference in the preparation methods of the catalysts.

Example 10 Evaluation on the Stability of Samples CAT-III-1~CAT-III-2

Each 0.2 g of sample catalysts CAT-III-1, CAT-III-2 and CAT-III-17 were added to fixed bed reactors with an inner diameter of 1 cm. The evaluation was carried out under the reaction condition A in Example 9.

Figure 9:
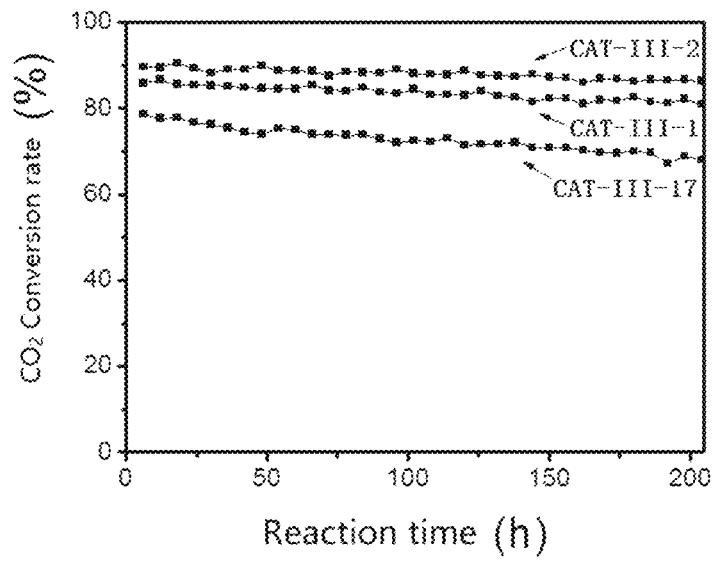
FIG. 9 are figures comparing the catalytic stability of samples CAT-III-1, CAT-III-2 and CAT-III-17; wherein, (a) shows the relationship of conversion rate of carbon dioxide and the reaction time; (b) shows the relationship of conversion rate of methane and the reaction time.
Figure 9:
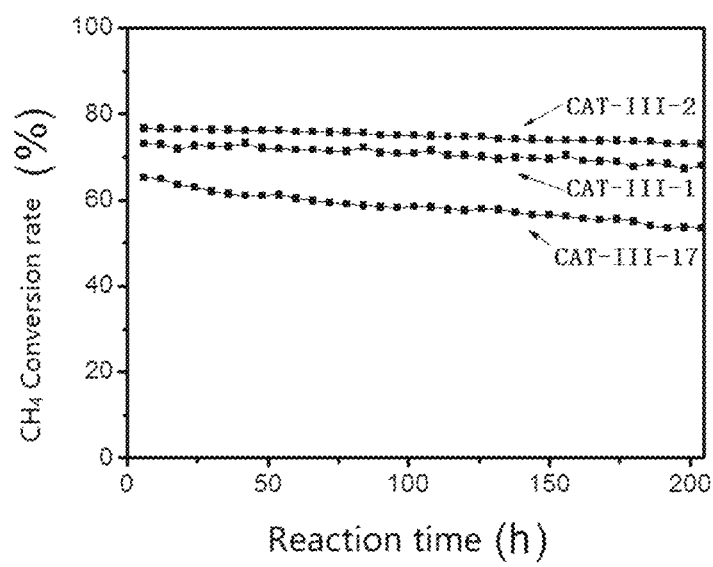

The stability test results of catalysts CAT-III-1, CAT-III-2 and CATA-III-17 are shown in FIG. 9(a) and FIG. 9(b). It can be seen from FIG. 9 that, CAT-III-1 and CAT-III-2, which contained noble metals and iron group metals in their active elements, maintain a relatively good stability in the conversion rates of carbon dioxide and methane under atmospheric pressure and at 800° C. within 204 hours of the reaction. Those catalysts did not contain noble metals provided a slightly lower stability. The stability of the catalyst: CAT-III-2>CAT-III-1>CAT-III-17, which means that the addition of the noble metals improve the stability of the catalyst. At the same time, the data in FIG. 9(a) and FIG. 9(b) indicate that, except for the improvement of the stability, the conversion rates of carbon dioxide and methane are also significantly raised after the introduction of noble metals to the catalyst. Furthermore, after modified by adding a small quantity of rare earth elements, the conversion rates were also slightly raised.

Example 11 the Effect of Adding Noble Metals

Figure 10:
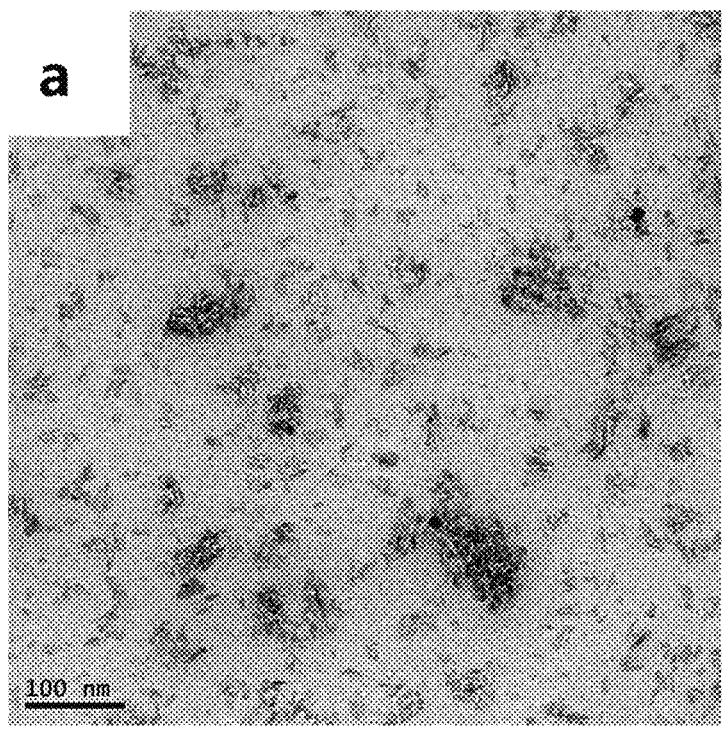
FIG. 10 are transmission electron microscope images of sample CAT-III-1, sample CAT-III-17 and CAT-III-18; (a) is the transmission electron microscopy image of sample CAT-III-1, (b) is the transmission electron microscopy of sample CAT-III-17, (c) is the transmission electron microscopy image of sample CAT-III-18.
Figure 10:
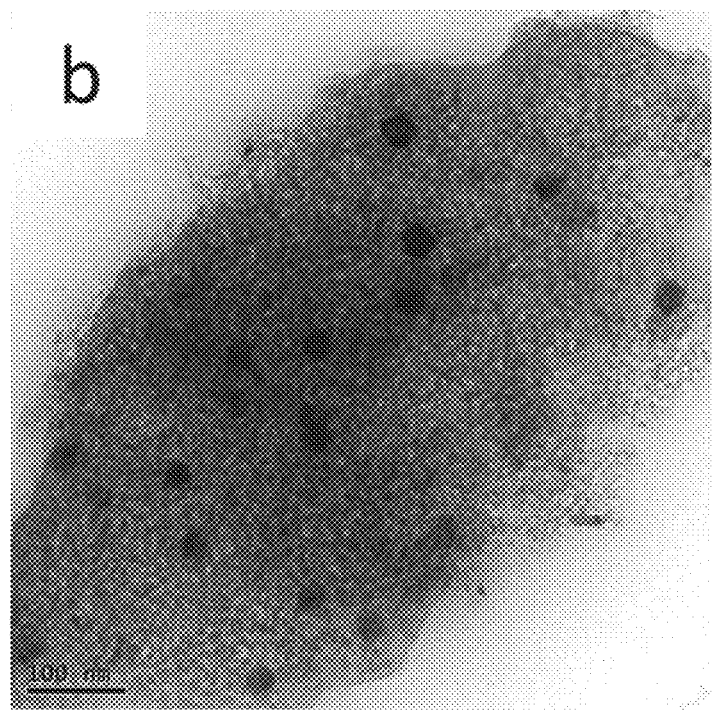
Figure 10:
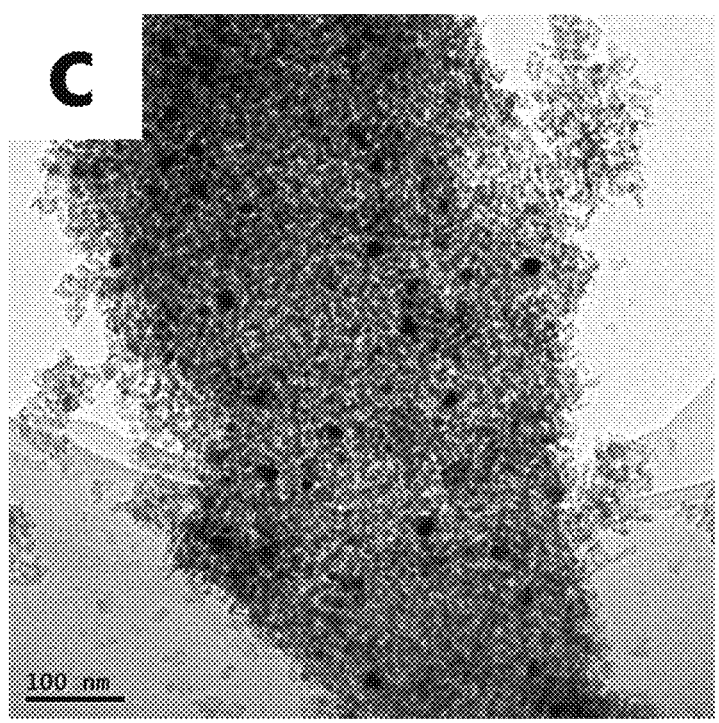

As the typical sample, the transmission electron microscopy image of CAT-III-1 was shown in FIG. 10(a). It can be seen from FIG. 10 that, on the catalyst containing noble metals, the metal particles have uniform sizes range from 5 nm to 15 nm, and the metal particles are dispersed uniformly on/in the support. FIG. 10(b) and FIG. 10(c) are transmission electron microscopy images of CAT-III-17 and CA-III-18, respectively. Comparing FIG. 10(a)~FIG. 10(c), it can be seen that, after adding rare earth elements to the non-noble metal catalyst, the particle size of the active metal particle decreases; however, after adding noble metals, the reduction in the particle size was much more bigger than that of adding rare earth elements. This well explained the reason why the sample catalysts containing noble metals provide a higher carbon dioxide and methane conversion rates. Meanwhile, small sized metallic active component particles have stronger interaction with the support, which is beneficial for enhancing the high temperature catalytic stability of the catalyst. Compared with adding modification component (such as rare earth elements), adding noble metal active component improved much more in the overall property of the iron group catalysts.

The foregoing is only several examples and preferred embodiments of the present application, and is not any kind of limit to the scope of the present application. However, it can be conceived that other variations and modifications can be made without departing from the scope covered by the claims of the present application, and all of these variations and modifications fall into the scope of protection of the present application.

The invention claimed is:

1. A catalyst, which includes a support, a modification component and an active component dispersed on/in the support; wherein the support is at least one selected from inorganic oxides and the support contains macropores and mesopores;
   wherein the active element is composed of platinum and cobalt, and the modification element is composed of erbium and potassium;
   wherein the molar ratio of platinum, cobalt, erbium and potassium is:
       Pt:Co:Er:K=0.1%~5%:1%~10%:0.3%~5%:0.2%~5%;
   the average pore size of the macropores is greater than 50 nm, and the average pore size of the mesopores is in a range from 1 nm to 50 nm; and
   the particle size of the active component dispersed on/in the support is in a range from 1 nm to 50 nm.

2. The catalyst according to claim 1, wherein the average pore size of the macropores is in a range from 1 μm to 2 μm; the average pore size of the mesopores is in a range from 5 nm to 15 nm; and the specific surface area of the support is in a range from 100 $m^2/g$ to 350 $m^2/g$.

3. The catalyst according to claim 1, wherein the weight percentage content of cobalt belonging to the active element in the catalyst is in a range from 1% to 10%; and
   the weight percentage content of platinum belonging to the active element in the catalyst is in a range from 0.1% to 5%.

4. The catalyst according to claim 1, wherein particle size of the active component dispersed on/in the support is in a range from 1 nm to 15 nm; and particle size of the modification component dispersed on/in the support is in a range from 1 nm to 50 nm.

5. The catalyst according to claim 1, wherein the weight percentage content of cobalt belonging to the active element in the catalyst is in a range from 3% to 6%; and the weight percentage content of platinum belonging to the active element in the catalyst is in a range from 0.5% to 3%.

6. The catalyst according to claim 1, wherein the weight percentage content of potassium in the catalyst is in a range from 0.1% to 10%.

7. A method for preparing the catalyst according to claim 1, which includes at least the steps as follows:
   a) impregnating the support in a solution containing the active element and the modified element, wherein the active element is composed of platinum and cobalt, and the modification element is composed of erbium and potassium, wherein the molar ratio of platinum, cobalt, erbium and potassium is:
       Pt: Co: Er: K=0.1%~5%: 1%~10%: 0.3%~5%: 0.2%~5%;
   b) separating to obtain the impregnated solid obtained in step a) which is dried, calcined under an air atmosphere and reduced by hydrogen to obtain the catalyst.

8. The method according to claim 7, wherein in step a), the impregnation is an ultrasound impregnation; and the total immersion time is in a range from 24 hours to 96 hours, and accumulation of the ultrasonic time is in a range from 2 hours to 10 hours; and
   in step b), the drying is conducted at a temperature range from 60° C. to 200° C.

9. The method according to claim 7, wherein in step b), the drying is vacuum drying conducted under a temperature range from 60° C. to 100° C. for a time range from 8 hours to 10 hours.

10. The method according to claim 7, wherein in step a), the ultrasound impregnation is an intermittent ultrasound impregnation; and the total immersion time is in a range from 36 hours to 60 hours, and accumulation of the ultrasonic time is in a range from 2 hours to 6 hours.

11. The method according to claim 7, wherein in step b), the temperature is raised from room temperature to a calcination temperature at a heating rate range from 1° C./min to 10° C./min to calcine the impregnated solid for no less than 1 hour, and the calcination temperature is in a range from 300° C. to 800° C.

12. The method according to claim 7, wherein in step b), the temperature is raised from room temperature to a calcination temperature at a heating rate range from 1° C./min to 5° C./min to calcine the impregnated solid for a time range from 2 hours to 4 hours, and the calcination temperature is in a range from 500° C. to 700° C.

13. The method according to claim 7, wherein in step b), the reduction by hydrogen is that the temperature is raised from room temperature to a reduction temperature at a heating rate range from 5° C./min to 20° C./min to reduce in hydrogen or a mixture of hydrogen and an inactive gas for no less than 1 hour, and the reduction temperature is in a range from 600° C. to 1000° C.;
   and flow velocity of hydrogen or the mixture of hydrogen and the inactive gas is in a range from 20 mL/min to 80 mL/min.

14. The method according to claim 7, wherein in step b), the reduction by hydrogen is that the temperature is raised from room temperature to a reduction temperature at a heating rate range from 5° C./min to 15° C./min to reduce in hydrogen for a time range from 1 hour to 2 hours, and the reduction temperature is in a range from 800° C. to 1000° C.; and the flow velocity of hydrogen is in a range from 20 mL/min to 40 mL/min.

15. The catalyst according to claim 1, wherein the weight percentage content of potassium in the catalyst is in a range from 0.1% to 5%.

16. A method of producing syngas by reforming methane with carbon dioxide comprises contacting the reactant containing methane and carbon dioxide with the catalyst of claim 1 to produce syngas at a reaction temperature from 600° C. to 900° C. and a reaction pressure from 0.1 MPa to 0.5 MPa; and in the reactant, the molar ratio of carbon dioxide to methane is as follows: carbon dioxide: methane is in a range from 0.5 to 2.

* * * * *